A. WILCOX.
Cultivator.
No. 64,927.
Patented May 21, 1867.
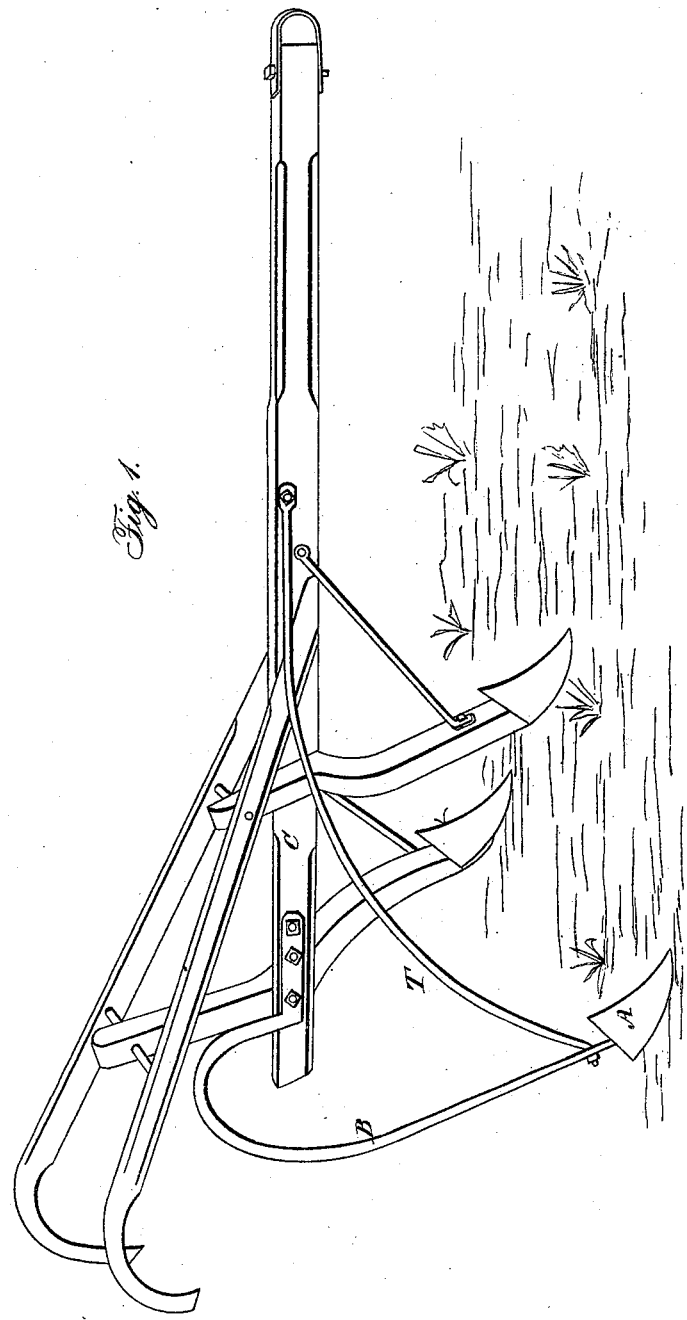
Witnesses:
A. Fallows
Thos. B. Harrison
Inventor:
Albert Wilcox

United States Patent Office.

ALBERT WILCOX, OF MAQUOKETA, IOWA.

Letters Patent No. 64,927, dated May 21, 1867.

SHOVEL-PLOUGH.

The Schedule referred to in these Letters Patent and making part of the same.

TO ALL WHOM IT MAY CONCERN:

Be it known that I, ALBERT WILCOX, of the town of Maquoketa, in the county of Jackson, and State of Iowa, have invented a new and useful improvement in Shovel-Ploughs; and I do hereby declare that the following is a full, clear, and exact description of the construction and operation of the same, reference being had to the annexed drawings, making a part of this specification, in which—

Figure 1 is a perspective view.

The nature of my invention consists in attaching a third shovel, A, by means of the curved supporting bar B, to the plough-beam C, and strengthening the aforesaid bar by the curved brace T. The arch of the supporting bar B I make sufficiently high to allow the corn plants to pass under it.

The operation of my improved plough is as follows: In cultivating corn I go around six, eight, or ten rows at a time. In doing this, the two shovels on the main plough cut two-thirds of the ground between the rows, and the next time around the shovel A, on the supporting bar B, cuts the remaining third, thus thoroughly moving the entire surface of the ground between the rows of plants, and finishing each row by once passing through, enabling the farmer to do with one horse the work of the two-horse sulky-ploughs.

What I claim as my invention, and wish to secure by Letters Patent, is—

The attachment of the third shovel A, by means of the curved supporting bar B, to the beam C of the main plough; also the manner of equalizing the draught of said plough by making the left-hand standard of the main plough more curved, and the shovel on the same a size larger, in the manner and for the purpose above set forth.

ALBERT WILCOX.

Witnesses:
 THOS. B. HARRISO.
 A. FELLOWS.